(12) United States Patent
Li (10) Patent No.: US 12,039,341 B2
(45) Date of Patent: Jul. 16, 2024

(54) INFORMATION PROCESSING METHOD AND DEVICE, APPARATUS, AND STORAGE MEDIUM

(71) Applicant: Lenovo (Beijing) Limited, Beijing (CN)

(72) Inventor: boyong Li, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 382 days.

(21) Appl. No.: 17/473,476

(22) Filed: Sep. 13, 2021

(65) Prior Publication Data
US 2022/0206822 A1    Jun. 30, 2022

(30) Foreign Application Priority Data

Dec. 31, 2020   (CN) .......................... 202011622262.3

(51) Int. Cl.
| | | |
|---|---|---|
| *G06F 9/44* | (2018.01) |
| *G06F 9/4401* | (2018.01) |
| *G06F 9/48* | (2006.01) |
| *G06F 16/903* | (2019.01) |

(52) U.S. Cl.
CPC .............. *G06F 9/441* (2013.01); *G06F 9/485* (2013.01); *G06F 16/90335* (2019.01)

(58) Field of Classification Search
CPC ................. G06F 1/32; G06F 1/12; G06F 9/44
See application file for complete search history.

(56) References Cited

U.S. PATENT DOCUMENTS

| | | | | |
|---|---|---|---|---|
| 7,797,752 B1 * | 9/2010 | Vaidya | ................ | H04L 12/4641 |
| | | | | 717/172 |
| 2012/0198436 A1 * | 8/2012 | Preimesberger | .... | G06F 11/3051 |
| | | | | 717/174 |
| 2018/0225653 A1 * | 8/2018 | Vokes | ................... | H04W 12/06 |

FOREIGN PATENT DOCUMENTS

| | | |
|---|---|---|
| CN | 101894033 A | 11/2010 |
| CN | 106970781 A | 7/2017 |

* cited by examiner

*Primary Examiner* — Keshab R Pandey
(74) *Attorney, Agent, or Firm* — ANOVA LAW GROUP, PLLC (57) ABSTRACT

An information processing method includes obtaining version information of an operating system to be installed at a computer apparatus; determining whether the operating system to be installed is supported by the computer apparatus according to the version information; and in response to determining that the operating system to be installed is not supported by the computer apparatus, displaying a prompt message on a current interface of the computer apparatus before an installation path of the operating system is determined, the prompt message being configured to prompt a user that the computer apparatus does not support the operating system to be installed.

14 Claims, 8 Drawing Sheets

```
DEBUG    Starting console installer...
DEBUG    Dispatching step 0
DEBUG    adding 1 VMware ESXi 7.0.0 installs on most systems but only systems on VMware's Compatibility Guide are supported.
DEBUG    adding 1 Consult the VMware Compatibility Guide at:
DEBUG    adding 1 http://www.vmware.com/resources/compatibility
DEBUG    adding 1 Select the operation to perform.
DEBUG    'data' dict contains: {'StepForward': True}
DEBUG    Dispatching step 1
DEBUG    'data' dict contains: {'StepForward': True, 'eulaFile': '/usr/lib/vmware/weasel/EULA'}
DEBUG    Dispatching step 2
DEBUG    adding 1 Scanning for available devices. This may take a few seconds.
DEBUG    'data' dict contains: {'StepForward': True, 'eulaFile': '/usr/lib/vmware/weasel/EULA'}
DEBUG    Dispatching step 3
INFO     Scanning disk t10.NVMe____SSDPE2KX010T7L_________________00013F800640230
INFO     Scanning disk t10.NVMe____PX04PMB096_____________________005800512390000
INFO     Scanning disk mpx.vmhba32:C0:T0:L0
INFO     Scanning disk mpx.vmhba33:C0:T0:L0
```
<!-- callout 301 points to "VMware ESXi 7.0.0" -->

INFORMATION PROCESSING METHOD AND DEVICE, APPARATUS, AND STORAGE MEDIUM

CROSS-REFERENCE TO RELATED APPLICATION

This application claim priority to Chinese Patent Application No. 202011622262.3, filed Dec. 31, 2020, the entire content of which is incorporated herein by reference.

TECHNICAL FIELD

The present disclosure relates to electronic technology, and relates to, but is not limited to, an information processing method and device, an apparatus, and a storage medium.

BACKGROUND

In a computer such as a server, an operating system is most basic and most important basic system software. From a perspective of a computer user, the operating system is embodied as various services provided, so a normal operation of the operating system is particularly important for the computer user, especially a server user.

However, in practice, after a new operating system is installed, the server user will encounter an operating system crash, including an endless loop (i.e., crash) or an unrecognizable error (i.e., blue screen). A direct loss of the operating system crash to the server user is an economic loss caused by business interruption.

SUMMARY

In accordance with the disclosure, there is provided an information processing method. The information processing method includes obtaining version information of an operating system to be installed at a computer apparatus; determining whether the operating system to be installed is supported by the computer apparatus according to the version information; and in response to determining that the operating system to be installed is not supported by the computer apparatus, displaying a prompt message on a current interface of the computer apparatus before an installation path of the operating system is determined, the prompt message being configured to prompt a user that the computer apparatus does not support the operating system to be installed.

Also in accordance with the disclosure, there is provided a computer apparatus including a memory and a processor. The memory stores a computer program. The processor is configured to execute the computer program to obtain version information of an operating system to be installed at a computer apparatus; determine whether the operating system to be installed is supported by the computer apparatus according to the version information; and in response to determining that the operating system to be installed is not supported by the computer apparatus, display a prompt message on a current interface of the computer apparatus before an installation path of the operating system is determined, the prompt message being configured to prompt a user that the computer apparatus does not support the operating system to be installed.

DETAILED DESCRIPTION OF THE EMBODIMENTS

In order to make the objectives, technical solutions, and advantages of the embodiments of the present disclosure clearer, the specific technical solutions of the present disclosure will be described in further detail in combination with the accompanying drawings. The following embodiments are used to explain the present disclosure rather than to limit the scope of the present disclosure.

Unless otherwise defined, all technical and scientific terms used herein have the same meaning as commonly understood by those skilled in the technical field of the present disclosure. The terms used herein are for the purpose of describing the embodiments of the present disclosure only and are not intended to limit the present disclosure.

In the following description, "some embodiments" are referred to, which describe a subset of all possible embodiments, but it can be understood that "some embodiments" may be the same subset or different subsets of all possible embodiments, and can be combined with each other when there is no conflict.

It should be noted that the terms "first\second\third" involved in the embodiments of the present disclosure only distinguish similar or different objects, and do not represent a specific order of the objects. It can be understood that, "first\second\third" can be interchanged in specific order or sequence when permitted, so that the embodiments of the present disclosure described herein can be implemented in an order other than those illustrated or described herein.

According to user needs, versions of operating systems installed at different servers are different, and some are customized operating systems. Therefore, if a user installs an operating system that is not compatible with the server, user experience is directly affected, which leads to: an apparatus manufacturer often receives user complaints, asking why they have problems after reinstalling the operating system. In fact, the server prompts the user not to install an unsupported operating system through an instruction for use, a web page, an email, etc. However, such prompt manners are often ignored or forgotten by the user, resulting in the user still installing operating systems not supported by an apparatus. More seriously, for the server that provides a web page (such as Weibo page), a database, a data center (such as one used to store TikTok streaming media), bank data storage (with better security and redundancy of the server), a high-performance computing, etc., if the server cannot be used or run normally, these services will be interrupted or stopped, which may even lead to loss of critical data (such as loss of orders). The loss of data directly leads to major problems such as an economic loss, especially in financial industry.

An information processing method provided by the embodiments of the present disclosure can be applied to a computer apparatus, which can be a server, a cluster server, a mobile terminal (such as a mobile phone, a tablet computer, an e-readers, etc.), a notebook computer, a personal computer, a robot, or an unmanned aerial vehicle, or another apparatus capable of information processing. Functions implemented by the information processing method can be implemented by a processor in the computer apparatus calling program codes, and the program code can be stored in a computer storage medium. As can be seen, the computer apparatus at least includes the processor and the storage medium.

Figure 1:
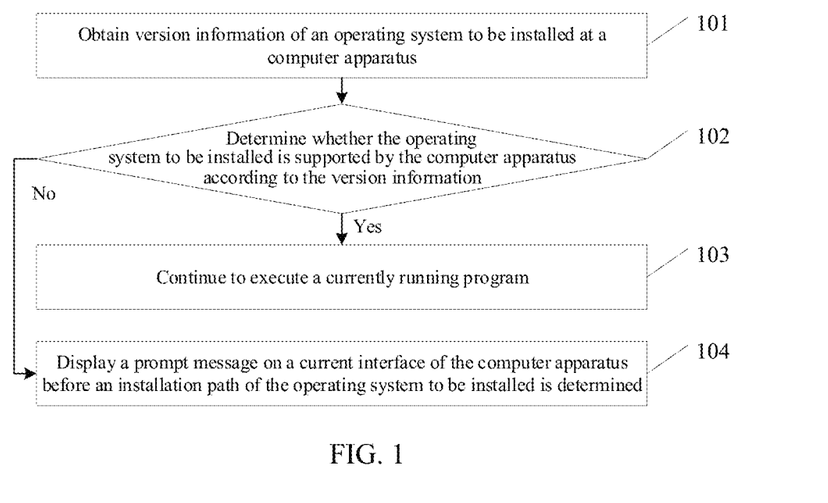
FIG. 1 is a schematic diagram of an implementation flow of an information processing method according to an embodiment of the present disclosure.

FIG. 1 is a schematic diagram of an implementation flow of the information processing method according to an embodiment of the present disclosure. As shown in FIG. 1, the method includes the following process 101 to process 104.

101, obtaining version information of an operating system to be installed at the computer apparatus.

When the computer apparatus is turned on, a key field is captured and it is determined whether the user is about to install the operating system based on the key field. As another example, when the computer apparatus is turned on, it is determined whether the user is about to install the operating system when detecting that the apparatus is loading a startup file related to system installation.

In some embodiments, in a process of preloading a boot file of the operating system to be installed by the computer apparatus, the version information of the operating system can be identified from the loaded boot file. As such, the version information of the operating system can be obtained as quickly as possible, so as to determine whether the operating system is supported by the computer apparatus in a timely manner, and then when the operating system is not supported by the computer apparatus, the user is notified as soon as possible to terminate the installation of the wrong version of the operating system.

102, determining whether the operating system to be installed is supported by the computer apparatus according to the version information. If yes, 103 is executed; otherwise, 104 is executed.

103, continuing to execute a currently running program.

In some embodiments, if it is determined that the operating system to be installed is supported by the computer apparatus, the computer apparatus can determine whether a life cycle of the operating system has ended. If the life cycle of the operating system has ended, a third prompt message is displayed on the current interface. The prompt message is configured to prompt the user that the life cycle of the operating system has ended, and it is recommended to install a higher version of the operating system.

It can be understood that, if the user installs an operating system whose life cycle has ended, it may have a security impact. Safety is very important, especially for the financial industry.

104, displaying a prompt message on the current interface of the computer apparatus before an installation path of the operating system to be installed is determined. The prompt message is configured to prompt the user that the computer apparatus does not support the operating system to be installed.

In most cases, once the computer apparatus starts to officially install the operating system, the user cannot control the computer apparatus to exit the installation. In view of this, in some embodiments, when the computer apparatus determines that the operating system to be installed is not supported by the computer apparatus, it can also suspend execution of the currently running program. As such, it is avoided that the computer apparatus has officially installed the operating system to a corresponding path before the user instructs the computer apparatus to exit the installation, which saves time loss of the user.

In some embodiments, an interrupt program may be sent to the processor, so that the processor suspends the currently running program.

It can be understood that, if the computer apparatus determines the installation path, the computer apparatus will start to officially install the operating system to be installed at this time. Therefore, in order to avoid this situation as much as possible, the user is alerted in time that the computer apparatus does not support the operating system to be installed currently, and the prompt message is displayed on the current interface of the computer apparatus before the installation path is determined. As such, the computer apparatus achieves a purpose of promptly and clearly alerting the user, which reduces the time loss of the user as much as possible, reduces a probability of the user installing a wrong operating system as much as possible, and reduces business interruption caused by the user installing a wrong operating system, thereby reducing the economic loss of the user.

Figure 2:
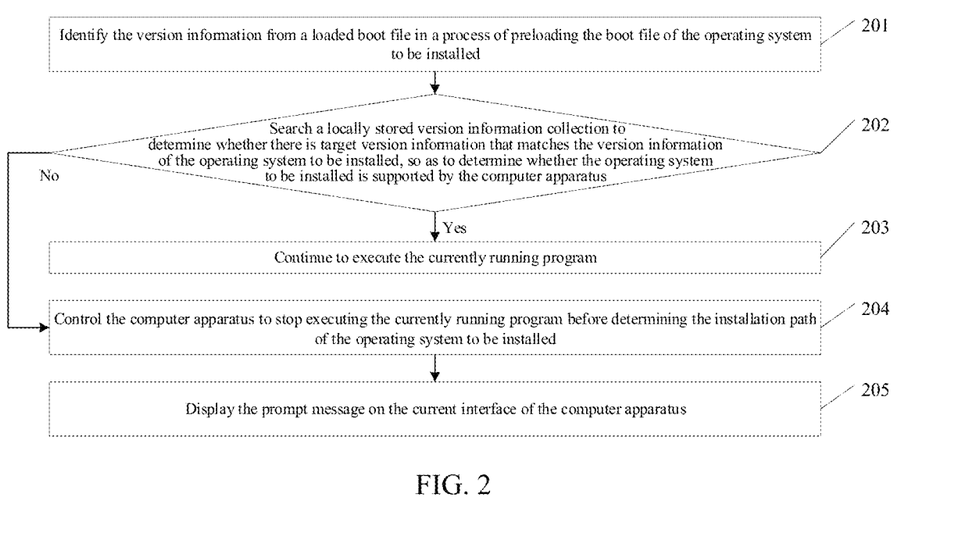
FIG. 2 is a schematic diagram of an implementation flow of an information processing method according to an embodiment of the present disclosure.

The embodiments of the present disclosure also provide another information processing method. FIG. 2 is a schematic diagram of an implementation flow of the information processing method according to an embodiment of the present disclosure. As shown in FIG. 2, the method includes the following process 201 to process 205.

201, identifying the version information from the loaded boot file in the process of preloading the boot file of the operating system to be installed.

It can be understood that, the boot file is actually a file pre-loaded into a cache by the computer apparatus before officially installing the operating system to the corresponding installation path. Therefore, in the process of preloading the boot file, the computer apparatus captures the version information from the loaded boot file, and can determine in time whether the operating system is a system supported by the computer apparatus according to the version information, which minimizes the time loss and economic loss of the user.

Figure 3:
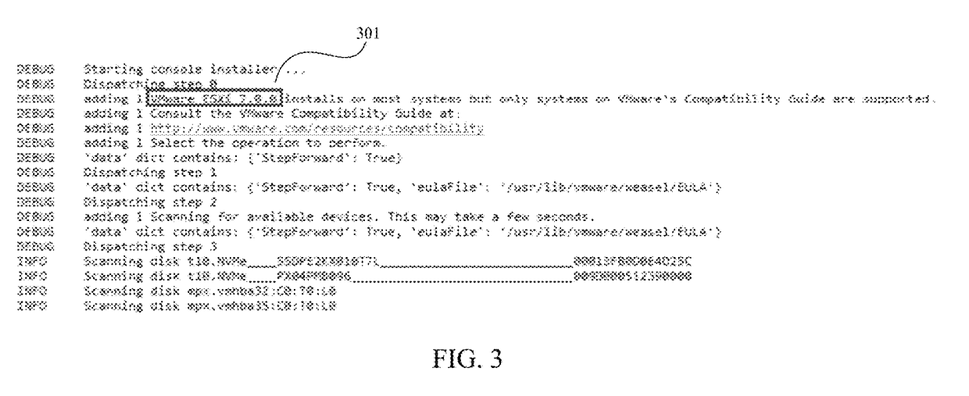
FIG. 3 is a schematic diagram of obtaining version information from serial over LAN (SOL) information.

For example, in some embodiments, as shown in FIG. 3, the computer apparatus may capture the version information of the operating system to be installed from information shown in black box 301 in serial over LAN (SOL), and this information appeared long before disk formatting. Last 4 lines in the figure indicate that the computer apparatus is scanning a hard disk, and it takes a long time to complete the scan of the hard disk before starting the disk formatting and installation. As can be seen, the version information was captured very early, so that there is enough time to prompt the user.

202, searching a locally stored version information collection to determine whether there is target version information that matches the version information of the operating system to be installed, so as to determine whether the operating system to be installed is supported by the computer apparatus. If yes, 203 is executed; otherwise, 204 is executed. The version information collection includes version information of the operating system supported by the computer apparatus.

It can be understood that, the version information collection is stored locally instead of being stored in cloud, so that the computer apparatus does not need to request the version information collection from the cloud anymore, but can directly call it locally. As such, time cost to obtain the version information collection can be saved, so as to determine whether the operating system to be installed is supported by the computer apparatus in a more timely manner, and the user can be alerted in time when the operating system is not supported, which reduces the economic loss and time loss of the user as much as possible. In some other embodiments, the version information collection may also be stored in the cloud.

Different computer apparatuses, i.e., different products, may support different operating systems. Therefore, a service provider can establish corresponding version information collection for each type of product. In some embodiments, the version information collection includes version information of all operating systems that are not currently supported by the computer apparatus, so that occurrence of missed detections can be avoided, which reduces the probability of the user installing the wrong operating system.

The version information of the operating systems not supported by the computer apparatus stored in the version information collection includes the version information of those systems whose life cycles have ended. This is because if the user installs the operating system whose life cycle has ended, it may have the security impact. Safety is very important, especially for the financial industry.

Correspondingly, in some embodiments, if the computer apparatus does not find the target version information that matches the version information of the operating system to be installed from the version information collection, it is determined that the operating system is supported by the computer apparatus; otherwise, if the computer apparatus finds the version information that matches the version information of the operating system to be installed from the version information collection, it is determined that the operating system is not supported by the computer apparatus.

In some other embodiments, the version information collection may only include version information of all operating systems currently supported by the computer apparatus. As such, if the computer apparatus does not find the target version information that matches the version information of the operating system to be installed from the version information collection, it is determined that the operating system is not supported by the computer apparatus; otherwise, if the computer apparatus finds the version information that matches the version information of the operating system to be installed from the version information collection, it is determined that the operating system is supported by the computer apparatus. Correspondingly, in some embodiments, the computer apparatus can obtain an upgrade package of a unified extensible firmware interface (UEFI) or a baseboard management controller (BMC) configured to upgrade the computer apparatus. The upgrade package includes at least version information of new operating systems supported by the computer apparatus, the version information in the version information collection is updated according to the upgrade package.

In some embodiments, if the version information of the operating system to be installed is the same as certain version information in the version information collection, it is determined that the two are matched.

203, continuing to execute the currently running program.

204, controlling the computer apparatus to stop executing the currently running program before determining the installation path of the operating system to be installed, and then executing 205.

In some embodiments, the interrupt program may be sent to the processor, so that the processor suspends execution of the currently running program. It can be understood that, when determining that the operating system to be installed is not supported by the computer apparatus, the computer apparatus stops executing the currently running program. As such, it is avoided that the computer apparatus has officially installed the operating system to the corresponding path before the user instructs the computer apparatus to exit the installation, which reduces the time loss of the user.

205, displaying the prompt message on the current interface of the computer apparatus. The prompt message is configured to prompt the user that the computer apparatus does not support the operating system to be installed.

It can be understood that, the reason that the currently running program is stopped before the installation path of the operating system to be installed is determined, and the user is prompted on the current interface that the operating system is not supported is because the apparatus has just been loaded the startup file for installing the operating system, but the installation has not yet officially started. While after the installation path is determined, especially after the disk formatting, the user can only exit after the installation is completed, which greatly loses user time. Therefore, prompting the user as early as possible can save time cost of the user, and reduce the time loss, economic loss, and user complaints.

Figure 4:
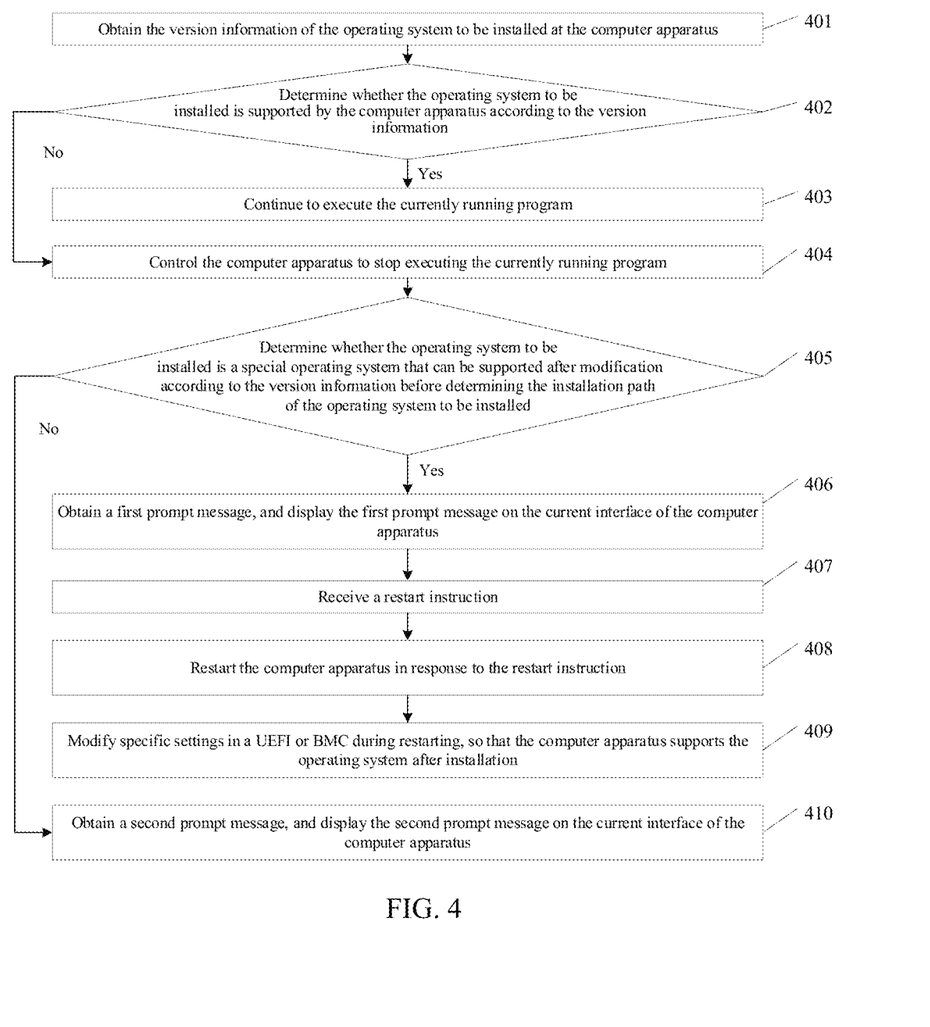
FIG. 4 is a schematic diagram of an implementation flow of an information processing method according to an embodiment of the present disclosure.

The embodiments of the present disclosure also provide another information processing method. FIG. 4 is a schematic diagram of an implementation flow of the information processing method according to an embodiment of the present disclosure. As shown in FIG. 4, the method includes the following process 401 to process 410.

401, obtaining the version information of the operating system to be installed at the computer apparatus.

402, determining whether the operating system to be installed is supported by the computer apparatus according to the version information. If yes, 403 is executed; otherwise, 404 is executed.

403, continuing to execute the currently running program.

404, controlling the computer apparatus to stop executing the currently running program. Then, 405 is executed.

405, determining whether the operating system to be installed is a special operating system that can be supported after modification according to the version information before determining the installation path of the operating system to be installed. If yes, 406 is executed; otherwise, 410 is executed.

In some embodiments, the computer apparatus can determine whether the operating system to be installed is the special operating system that can be supported after modification from the version information collection stored locally. For example, the version information collection not only records the version information of the operating systems that are not supported by the computer apparatus, but also marks those special operating systems that can be supported after modification. After the computer apparatus finds the target version information that matches the version information of the operating system to be installed in the version information collection, if the target version information has mark information, it is determined that the operating system to be installed is the special operating system that can be supported after modification. In some other embodiments, the version information collection can also record the version information of the operating system that is not supported by the computer apparatus by recording each version information and its corresponding mark information, and the mark information is configured to mark whether the corresponding version information is the version information of the operating system that the computer apparatus can support after modification.

406, obtaining a first prompt message, and displaying the first prompt message on the current interface of the computer apparatus. The first prompt message is configured to prompt the user that the computer apparatus does not support the operating system, but it can be supported after the computer apparatus is restarted.

It should be noted that the first prompt message is an example of the prompt message. There are various ways to obtain the first prompt message. For example, the computer apparatus directly obtains the prompt message from locally stored messages or generates the first prompt message.

407, receiving a restart instruction. The restart instruction is configured to instruct to restart the computer apparatus.

408, restarting the computer apparatus in response to the restart instruction.

409, modifying specific settings in the UEFI or BMC during restarting, so that the computer apparatus supports the operating system after installation.

Here, the computer apparatus automatically modifies the specific settings in the UEFI or BMC because there may be multiple modified items. If the user modifies manually, it is complicated on one hand, which is not conducive to shortening the installation delay; on the other hand, the user may make a wrong selection, which results in an installation error, so that the installed system may still not be able to be used normally. While automatic modification is a fast and accurate way. For the user, the installation can be completed by just restarting once, and the system can be used normally after installation.

It can be understood that, some operating system versions may have some problems, and the computer apparatus needs to make some specific settings in the UEFI or BMC to be compatible with the system. That is, although the operating system to be installed is not supported by the computer apparatus, there are still ways to make the computer apparatus support the operating system. For example, the computer apparatus needs to support a 2008 operating system that is not supported, but the system does not support USB 3.0, so that the system does not support keyboard and mouse, which causes the user cannot continue to install the system through the keyboard or mouse, and cannot use it after installation. In this case, the computer apparatus can control the UEFI or BMC to turn off relevant options of USB 3.0, which is equivalent to only enabling functions of USB 2.0 and 1.0, so that the user can use the keyboard and mouse normally, so as to successfully complete installation of the operating system and subsequent normal use. Otherwise, after the hard disk is formatted, when the user is required to make a selection, the operating system cannot be continued to install because the keyboard or mouse cannot be used.

410, obtaining a second prompt message, and displaying the second prompt message on the current interface of the computer apparatus. The second prompt message is configured to prompt the user that the computer apparatus does not support the operating system to be installed, and it is recommended to terminate the installation of the operating system through a specific shortcut key.

It should be noted that the second prompt message is another example of the prompt message. Similarly, there are various ways to obtain the second prompt message. For example, the computer apparatus directly calls the second prompt message from locally pre-stored messages or directly generates the second prompt message.

Regarding which shortcut key is used to terminate the installation of the operating system, the shortcut key can be directly prompted in the second prompt message. For example, the use is prompted to exit the installation by means of "shortcut key+Q".

Sometimes the users install a wrong version of operating system (OS) at their computer apparatus. After encountering problems, they will complain that a computer apparatus provider did not explicitly tell them.

In order to reduce probability of installing the wrong OS version, related solution 1 is to inform the user through an electronic document or a web page about which operating system versions are currently compatible with the computer apparatus. A disadvantage of this solution is that this prompt method is not obvious enough to attract user's attention, which may cause the user to ignore these small details.

Related solution 2 is to inform the user through a printed material, a manual, or another paper-based method about which operating system versions are currently compatible with the computer apparatus. A disadvantage of this solution is that it is easy to be forgotten, and it is still not clear enough to remind the user.

Based on this, an exemplary application of the embodiments of the present disclosure in an actual application scenario will be described below.

In view of the above-mentioned problems and the disadvantages of existing solutions, the embodiments of the present disclosure provide a method for real-time detection and prompt installation of the correct operating system version.

In this method, when detecting that the user wants to install the operating system (as far as possible before formatting the hard disk), the system obtains key version information through a key file or a SOL log, and finds out which operating system version will be installed at the computer apparatus, and then compares with the current compatible OS version information stored in the UEFI or BMC. If the user has installed a version supported by the computer apparatus, there will be no prompt; if the user has installed a version that is not supported by the computer apparatus, a pop-up window will be displayed, telling the user that it is better to install a version compatible with the computer apparatus, and the user can choose to continue or exit.

In addition, if the operating system version installed by the user needs to be supported with some specific settings in the UEFI, the computer apparatus can also prompt the user to restart the apparatus to modify options, or control the UEFI/BMC to automatically modify to meet requirements of the operating system version that can be installed.

In some embodiments, the compatible OS version information stored in the system can be updated with a FW upgrade of the UEFI/BMC.

Below are advantages of adopting the present solution.

1, the user is informed in a timely and clear manner when the user chooses an incompatible operating system.

2, a list of compatible OS versions can be updated through the upgrade of the UEFI/BMC. The user may be prompted of some OS version information whose life cycle has ended.

It can be understood that, each version of the operating system has its own life cycle, and the system will not be updated after this cycle. Therefore, the user is not recommended to use these systems. Because if the user installs such a system that is no longer updated, it may bring the security impact. Safety is very important, especially for the financial industry.

3, the user complaints are reduced, and user satisfaction is improved.

Figure 5:
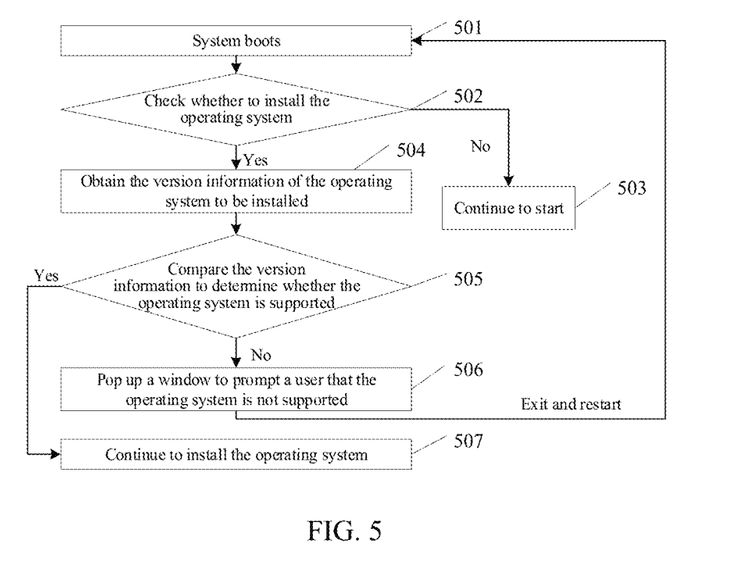
FIG. 5 is a schematic diagram of an implementation flow of an information processing method according to an embodiment of the present disclosure.

The embodiments of the present disclosure provide an information processing method. As shown in FIG. 5, the method includes the following process 501 to process 507.

501, system boots.

502, checking whether to install the operating system. If yes, 504 is executed; otherwise, 503 is executed.

In some embodiments, when the computer apparatus is turned on, the key field is captured and it is determined whether the user is about to install the operating system based on the key field. As another example, when the computer apparatus is turned on, it is determined whether the user is about to install the operating system when detecting that the apparatus is loading the startup file related to system installation.

503, continuing to start.

504, obtaining the version information of the operating system to be installed.

505, comparing the version information to determine whether the computer apparatus supports the operating system. If yes, process 507 is executed; otherwise, process 506 is executed.

506, popping up a window to prompt the user that the operating system is not supported.

Figure 6:
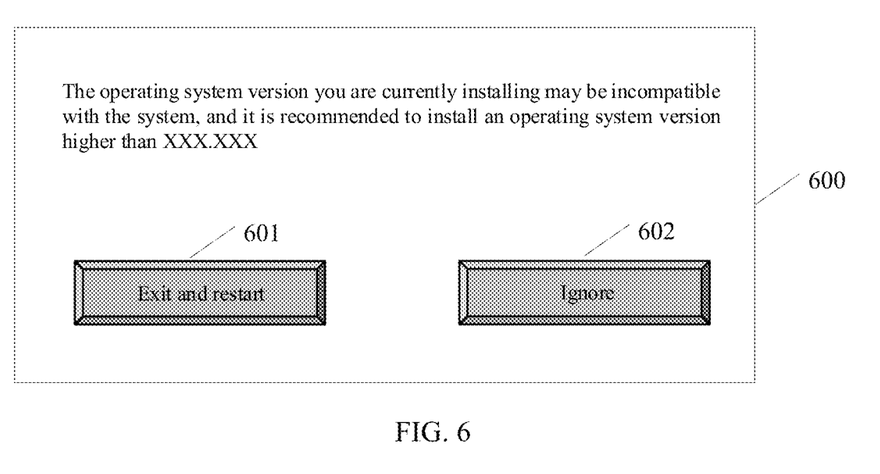
FIG. 6 is a schematic diagram of a prompt window according to an embodiment of the present disclosure.

For example, the window is shown in FIG. 6, and a prompt window 600 prompts the user that "the operating system version you are currently installing may be incompatible with the system, and it is recommended to install an operating system version higher than XXX.XXX". Meanwhile, selection buttons 601 and 602 are displayed in the window 600, so that the user can control the computer apparatus to exit the installation and restart by clicking the button 601, and can also control the computer apparatus to continue the installation by clicking the button 602. The user can also trigger the selection buttons 601 and 602 through a shortcut. For example, the user triggers the selection button 601 through (shortcut key+Q) or (Q), and triggers the selection button 602 through (shortcut key+I) or (I). In some embodiments, the selection button 601 in the window may be replaced by (shortcut key+Q) or (Q), and the selection button 602 in the window may be replaced by (shortcut key+I) or (I).

507, continuing to install the operating system.

Based on the foregoing embodiments, an information processing device provided by the embodiments of the present disclosure may be configured to include various modules and various units included in each module, which may be implemented by a processor or a specific logic circuit. In the implementation, the processor can be a central processing unit (CPU), a microprocessor (MPU), a digital signal processor (DSP), a field programmable gate array (FPGA), etc.

Figure 7:
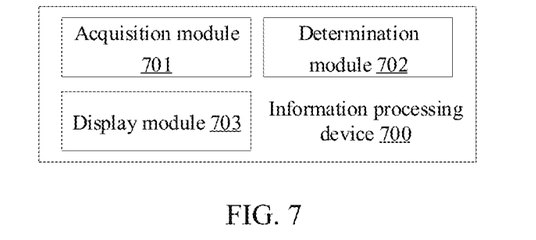
FIG. 7 is a schematic structural diagram of an information processing device according to an embodiment of the present disclosure.

FIG. 7 is a schematic structural diagram of the information processing device according to an embodiment of the present disclosure. As shown in FIG. 7, the device 700 includes an acquisition module 701, a determination module 702, and a display module 703. The acquisition module 701 is configured to obtain version information of an operating system to be installed. The determination module 702 is configured to determine whether the operating system to be installed is supported by a computer apparatus according to the version information. The display module 703 is configured to, before an installation path of the operating system to be installed is determined, display a prompt message on the current interface of the computer apparatus if the operating system to be installed is not supported by the computer apparatus. The prompt message is configured to prompt the user that the computer apparatus does not support the operating system to be installed.

In some embodiments, the acquisition module 701 is configured to identify the version information from a loaded boot file in the process of preloading the boot file of the operating system to be installed.

In some embodiments, the determination module 702 is configured to search a locally stored version information collection to determine whether there is target version information that matches the version information of the operating system to be installed, so as to determine whether the operating system to be installed is supported by the computer apparatus. The version information collection includes version information of the operating system supported by the computer apparatus.

In some embodiments, the information processing device 700 also includes a control module, which is configured to control the computer apparatus to stop executing a currently running program if the operating system to be installed is not supported by the computer apparatus.

In some embodiments, the prompt message is a first prompt message. The determination module 702 is also configured to, before the prompt message is displayed, determine whether the operating system to be installed is a special operating system that can be supported after modification according to the version information. The acquisition module 701 is also configured to obtain the first prompt message if the operating system to be installed is the special operating system. The first prompt message is configured to prompt the user that the computer apparatus does not support the operating system, but it can be supported after the computer apparatus is restarted.

In some embodiments, the information processing device 700 also includes a reception module, a response module, and a modification module. The reception module is configured to receive a restart instruction after the first prompt message is displayed. The restart instruction is configured to instruct to restart the computer apparatus. The response module is configured to restart the computer apparatus in response to the restart instruction. The modification module is configured to modify specific settings in UEFI or BMC during restarting, so that the computer apparatus supports the operating system after installation.

In some embodiments, the prompt message is a second prompt message. The acquisition module 701 is also configured to obtain the second prompt message if the operating system to be installed is not the special operating system that can be supported after modification. The second prompt message is configured to prompt the user that the computer apparatus does not support the operating system to be installed, and it is recommended to terminate the installation of the operating system through a specific shortcut key.

In some embodiments, the computer apparatus is a server.

The description of the above device embodiments is similar to the description of the above method embodiments, with similar beneficial effects as the method embodiments. For technical details not disclosed in the device embodiments of the present disclosure, reference can be made to the description of the method embodiments of the present disclosure for understanding.

It should be noted that, in the embodiments of the present disclosure, if the method described above is implemented in the form of a software functional module and sold or used as an independent product, it can be stored in a computer readable storage medium. Based on such an understanding, the technical solution in the embodiment of the present disclosure essentially, or in other words, all or part of the technical solution can be embodied in the form of a software product. The computer software product is stored in a storage medium, including several instructions to cause a computer apparatus (which can be a mobile phone, a tablet computer, a notebook computer, a personal computer, a server, a cluster server, etc.) to execute a method consistent with the present disclosure or part thereof, such as one of the above-described example methods. The storage medium includes a U-disk, a mobile hard disk, a read only memory (ROM), a magnetic disk, an optical disk, or another medium that can store program codes. As such, the embodiments of the present disclosure are not limited to any specific combination of hardware and software.

Figure 8:
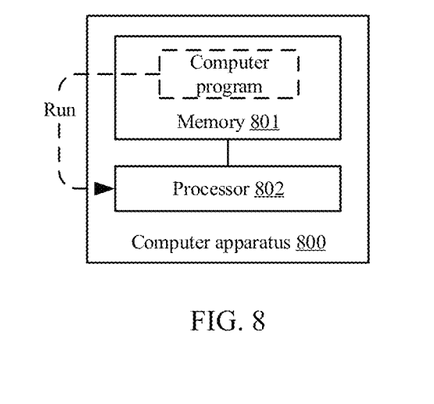
FIG. 8 is a schematic diagram of a hardware entity of a computer apparatus according to an embodiment of the present disclosure.

Correspondingly, as shown in FIG. 8, a computer apparatus 800 provided by the embodiments of the present disclosure includes a memory 801 and a processor 802. The memory 801 stores a computer program that can executed by the processor 802, and when the processor 802 executes the program, the processes in the method provided in the foregoing embodiments are implemented.

The memory 801 is configured to store instructions and applications executable by the processor 802, and can also cache data (such as image data, audio data, voice communication data, or video communication data) to be processed or processed by the processor 802 and each module in the computer apparatus 800, which can be implemented through a flash memory (FLASH) or a random access memory (RAM).

Correspondingly, the computer readable storage medium provided by the embodiments of the present disclosure has a computer program stored thereon, and the computer program, when executed by the processor, implements the processes in the method provided in the above-mentioned embodiments.

It should be noted that the description of the above storage medium and device embodiments is similar to the description of the above method embodiments, with similar beneficial effects as the method embodiments. For technical details not disclosed in the storage medium and device embodiments of the present disclosure, reference can be made to the description of the method embodiments of the present disclosure for understanding.

It should be understood that "an embodiment," "some embodiments," "some other embodiments" mentioned throughout the specification means that a specific feature, structure, or characteristic related to the embodiments is included in at least one embodiment of the present disclosure. Therefore, the appearances of "in an embodiment," "in one embodiment," "in some embodiments," or "in some other embodiments" in various places throughout the specification do not necessarily refer to the same embodiment. In addition, these specific features, structures, or characteristics can be combined in one or more embodiments in any suitable manner. It should be understood that in the various embodiments of the present disclosure, the size of the sequence number of the above-mentioned processes does not mean the order of execution, and the execution order of each process should be determined by its function and internal logic, and should not constitutes any limitation to the implementation process of the embodiments of the present disclosure. The sequence numbers of the foregoing embodiments of the present disclosure are only for description, and do not represent the superiority or inferiority of the embodiments.

It should be noted that the terms "include," "involve," or any other variations thereof are intended to cover non-exclusive inclusion, so that a process, method, object, or device including a series of elements not only includes those elements, but also includes other elements that are not explicitly listed, or also includes elements inherent to such processes, method, object, or device. Without further restrictions, the element associated with phrase "including a . . . " does not exclude the existence of other identical elements in the process, method, object, or device that includes the element.

In some embodiments of the present disclosure, it should be understood that the disclosed device and method can be implemented in other manners. The example device described above is only illustrative. For example, the division of the units is only a logical function division, and there may be other divisions in actual implementation, e.g., multiple units or components may be combined or integrated into another system, or some features may be omitted or not performed. In addition, the displayed or discussed mutual coupling or direct coupling or communication connection may be through some interfaces, and indirect coupling or communication connection of the device or unit may be in electrical, mechanical, or another form.

The units described as separate components may or may not be physically separated, and the components displayed as units may or may not be physical units, i.e., they may be located in one place, or distributed on multiple network units. Some or all of the units may be selected according to actual needs to achieve the objectives of the present disclosure.

In addition, the functional units in each embodiment of the present disclosure may be integrated into one processing unit, or each unit may be individually used as one unit, or two or more units may be integrated into one unit. The integrated unit herein can be implemented in the form of hardware or hardware plus software functional unit.

One of ordinary skill in the art can understand that all or part of the processes in the method of the embodiments described above can be implemented by a program instructing relevant hardware, and the program can be stored in a computer readable storage medium. When the program is executed, the processes in the method of the embodiments are executed. The storage medium includes a mobile storage device, a read only memory (ROM), a magnetic disk, an optical disk, or another medium that can store program codes.

If the integrated unit is implemented in the form of a software functional module and sold or used as an independent product, it can be stored in a computer readable storage medium. Based on such an understanding, the technical solution in the embodiment of the present disclosure essentially, or in other words, all or part of the technical solution can be embodied in the form of a software product. The computer software product is stored in a storage medium, including several instructions to cause a computer apparatus (which can be a mobile phone, a tablet computer, a notebook computer, a personal computer, a server, a cluster server, etc.) to execute a method consistent with the present disclosure or part thereof, such as one of the above-described example methods. The storage medium includes a mobile storage device, a ROM, a magnetic disk, an optical disk, or another medium that can store program codes.

The methods disclosed in some method embodiments provided in the present disclosure can be combined arbitrarily without conflict to obtain new method embodiments.

The features disclosed in some product embodiments provided in the present disclosure can be combined arbitrarily without conflict to obtain new product embodiments.

The features disclosed in some method or device embodiments provided in the present disclosure can be combined arbitrarily without conflict to obtain new method or device embodiments.

The above are only the embodiments of the present disclosure, but the scope of the present disclosure is not limited hereto. Any person skilled in the art can easily conceive changes or substitutions within the technical scope disclosed in the present disclosure, which should be within the scope of the present disclosure. The protection scope of the present application should be subject to the protection scope of the claims.

What is claimed is:

1. An information processing method comprising:
   obtaining version information of an operating system to be installed at a computer apparatus;
   determining whether the operating system to be installed is supported by the computer apparatus according to the version information;
   in response to determining that the operating system to be installed is not supported by the computer apparatus:
      determining whether the operating system to be installed is a special operating system that is supported after modification according to the version information; and
      in response to determining that the operating system to be installed is the special operating system, displaying a prompt message on a current interface of the computer apparatus before an installation path of the operating system is determined, the prompt message being configured to prompt a user that the computer apparatus does not support the operating system to be installed and that the computer apparatus is able to support the operating system to be installed after being restarted; and
   after the prompt message is displayed:
      receiving a restart instruction, the restart instruction being configured to instruct to restart the computer apparatus;
      restarting the computer apparatus in response to the restart instruction; and
      modifying a setting in a unified extensible firmware interface (UEFI) or a baseboard management controller (BMC) during restarting, to cause the computer apparatus to support the operating system to be installed, modifying the setting in the UEFI or BMC including selecting or deselecting an option corresponding to a function in the UEFI or BMC.

2. The method of claim 1, wherein obtaining the version information of the operating system to be installed includes, in a process of preloading a boot file of the operating system to be installed, identifying the version information from the loaded boot file.

3. The method of claim 1, wherein determining whether the operating system to be installed is supported by the computer apparatus according to the version information includes searching a locally stored version information collection to determine whether there is target version information that matches the version information of the operating system to be installed, so as to determine whether the operating system to be installed is supported by the computer apparatus, the version information collection including version information of operating systems supported by the computer apparatus.

4. The method of claim 1, further comprising:
   controlling the computer apparatus to stop executing a currently running program in response to determining that the operating system to be installed is not supported by the computer apparatus.

5. The method of claim 1,
   wherein the prompt message is a first prompt message;
   the method further comprising:
      in response to determining that the operating system to be installed is not supported by the computer apparatus and determining that the operating system to be installed is not the special operating system, displaying a second prompt message on the current interface of the computer apparatus before the installation path of the operating system is determined, the second prompt message being configured to prompt the user that the computer apparatus does not support the operating system to be installed and that it is recommended to terminate the installation of the operating system through a specific shortcut key.

6. The method of claim 1, wherein the computer apparatus includes a server.

7. The method of claim 1,
   wherein the prompt message is a first prompt message, and
   the method further comprising:
      in response to determining that the operating system to be installed is supported by the computer apparatus, determining whether a life cycle of the operating system to be installed has ended; and
      in response to determining that the life cycle of the operating system to be installed has ended, displaying a second prompt message on the current interface, the second prompt message being configured to prompt the user that the life cycle of the operating system to be installed has ended and that it is recommended to install a higher version of the operating system.

8. The method of claim 1, wherein obtaining the version information of the operating system to be installed includes:
   obtaining the version information of the operating system to be installed through a key file or a serial over LAN (SOL) log appearing before disk formatting.

9. The method of claim 1, wherein obtaining the version information of the operating system to be installed includes:
   determining whether the user is to install the operating system to be installed when the computer apparatus is turned on based on a key field; and
   in response to determining that the user is to install the operating system to be installed, obtaining the version information of the operating system to be installed.

10. A computer apparatus comprising:
    a memory storing a computer program; and
    a processer configured to execute the computer program to:
       obtain version information of an operating system to be installed at a computer apparatus;
       determine whether the operating system to be installed is supported by the computer apparatus according to the version information;

in response to determining that the operating system to be installed is not supported by the computer apparatus:
  determine whether the operating system to be installed is a special operating system that is supported after modification according to the version information; and
  in response to determining that the operating system to be installed is the special operating system, display a prompt message on a current interface of the computer apparatus before an installation path of the operating system is determined, the prompt message being configured to prompt a user that the computer apparatus does not support the operating system to be installed and that the computer apparatus is able to support the operating system to be installed after being restarted; and
after the prompt message is displayed:
  receive a restart instruction, the restart instruction being configured to instruct to restart the computer apparatus;
  restart the computer apparatus in response to the restart instruction; and
  modify a setting in a unified extensible firmware interface (UEFI) or a baseboard management controller (BMC) during restarting, to cause the computer apparatus to support the operating system to be installed, modifying the setting in the UEFI or BMC including selecting or deselecting an option corresponding to a function in the UEFI or BMC.

11. The computer apparatus of claim 10, wherein the processer is further configured to execute the computer program to, in a process of preloading a boot file of the operating system to be installed, identify the version information from the loaded boot file.

12. The computer apparatus of claim 10, wherein the processer is further configured to execute the computer program to search a locally stored version information collection to determine whether there is target version information that matches the version information of the operating system to be installed, so as to determine whether the operating system to be installed is supported by the computer apparatus, the version information collection including version information of operating systems supported by the computer apparatus.

13. The computer apparatus of claim 10, wherein the processer is further configured to execute the computer program to control the computer apparatus to stop executing a currently running program in response to determining that the operating system to be installed is not supported by the computer apparatus.

14. The computer apparatus of claim 10, wherein:
the prompt message is a first prompt message; and
the processer is further configured to execute the computer program to:
  in response to determining that the operating system to be installed is not supported by the computer apparatus and determining that the operating system to be installed is not the special operating system, display a second prompt message on the current interface of the computer apparatus before the installation path of the operating system is determined, the second prompt message being configured to prompt the user that the computer apparatus does not support the operating system to be installed and that it is recommended to terminate the installation of the operating system through a specific shortcut key.

* * * * *